US010670564B2

(12) United States Patent
Voinea

(10) Patent No.: US 10,670,564 B2
(45) Date of Patent: Jun. 2, 2020

(54) PHOTOACOUSTIC DETECTOR

(71) Applicant: 9334-3275 QUEBEC INC., Cote Saint-Luc (CA)

(72) Inventor: Stefan Voinea, Brossard (CA)

(73) Assignee: 9334-3275 QUEBEC INC., Cote Saint-Luc (Quebec) (CA)

( * ) Notice: Subject to any disclaimer, the term of this patent is extended or adjusted under 35 U.S.C. 154(b) by 0 days.

(21) Appl. No.: 15/572,633

(22) PCT Filed: May 4, 2016

(86) PCT No.: PCT/CA2016/050511
§ 371 (c)(1),
(2) Date: Nov. 8, 2017

(87) PCT Pub. No.: WO2016/179693
PCT Pub. Date: Nov. 17, 2016

(65) Prior Publication Data
US 2018/0136166 A1     May 17, 2018

Related U.S. Application Data

(60) Provisional application No. 62/389,132, filed on Feb. 18, 2016, provisional application No. 62/179,502, filed on May 11, 2015.

(51) Int. Cl.
*G01N 29/036* (2006.01)
*G01N 29/22* (2006.01)
(Continued)

(52) U.S. Cl.
CPC ............. *G01N 29/036* (2013.01); *G01N 7/00* (2013.01); *G01N 21/1702* (2013.01);
(Continued)

(58) Field of Classification Search
CPC .... G01N 29/036; G01N 7/00; G01N 21/1702; G01N 29/222; G01N 29/2425
(Continued)

(56) References Cited

U.S. PATENT DOCUMENTS

| 4,163,382 A | 8/1979 | Amer |
| 6,391,096 B1 | 5/2002 | Waters et al. |

(Continued)

FOREIGN PATENT DOCUMENTS

WO     2008074442 A1     6/2008

OTHER PUBLICATIONS

Donal Skelly, "The Transition to Next-Generation Online DGA Monitoring Technologies Utilizing Photo-Acoustic Spectroscopy", General Electry Company, Copyright 2013, 8 pages.
(Continued)

*Primary Examiner* — Nimeshkumar D Patel
*Assistant Examiner* — Jean F Morello
(74) *Attorney, Agent, or Firm* — Erise IP, P.A.

(57) ABSTRACT

A photoacoustic detector for detecting a gas which includes a resonant cavity having an inner wall capable of absorbing electromagnetic radiation and a passageway for circulating the gas through the resonant cavity. The detector also includes an electromagnetic source for generating an electromagnetic energy and an optical window associated with the electromagnetic source for introducing the electromagnetic energy into the resonant cavity towards the absorbing inner wall surface, thereby preventing the electromagnetic energy from radiating throughout the whole length of the resonant cavity. A pressure sensor is provided for detecting a pressure signal inside the resonant cavity which is representative of the gas being detected. A method is also provided for detecting a gas using the photoacoustic detector.

31 Claims, 8 Drawing Sheets

(51) Int. Cl.
   *G01N 29/24*   (2006.01)
   *G01N 21/17*   (2006.01)
   *G01N 7/00*    (2006.01)
   *G01N 30/62*   (2006.01)
(52) U.S. Cl.
   CPC ....... *G01N 29/222* (2013.01); *G01N 29/2425* (2013.01); *G01N 30/62* (2013.01); *G01N 2021/1704* (2013.01)
(58) Field of Classification Search
   USPC .................................................. 73/24.02
   See application file for complete search history.

(56) References Cited

U.S. PATENT DOCUMENTS

| | | | |
|---|---|---|---|
| 7,263,871 | B2 | 9/2007 | Selker et al. |
| 7,398,672 | B2 | 7/2008 | Riddle |
| 7,765,871 | B2 | 8/2010 | Riddle |
| 8,347,687 | B2 | 1/2013 | Cunningham |
| 9,551,829 | B2 * | 1/2017 | Brun .................. G01N 21/1702 |
| 10,288,553 | B2 * | 5/2019 | Rouxel ............. G01N 29/2418 |
| 2002/0194897 | A1 * | 12/2002 | Arnott ................ G01N 21/1702 73/23.31 |
| 2007/0151325 | A1 * | 7/2007 | Kauppinen ........ G01N 21/1702 73/24.02 |
| 2012/0271188 | A1 * | 10/2012 | Van Kesteren ...... A61B 5/0095 600/532 |
| 2014/0026639 | A1 | 1/2014 | Wang et al. |
| 2014/0165704 | A1 | 6/2014 | Maity et al. |
| 2015/0059434 | A1 | 3/2015 | Maity et al. |
| 2015/0059435 | A1 | 3/2015 | Choudhury et al. |
| 2015/0285737 | A1 * | 10/2015 | Gliere .................... G01N 21/03 356/437 |
| 2016/0282313 | A1 | 9/2016 | Robinson |
| 2016/0290896 | A1 | 10/2016 | Calvert et al. |
| 2018/0059087 | A1 | 3/2018 | Robinson et al. |

OTHER PUBLICATIONS

Miklos, A, et al., Application of Acoustic Resonators in Photoacoustic Trace Gas Analysis and Metrology; Review of Scientific Instruments, vol. 72, No. 4: Apr. 2001.

PCT Patent Application PCT/CA2016/050511 International Search Report dated Jul. 22, 2016.

PCT Patent Application PCT/CA2016/050511 Written Opinion dated Jul. 22, 2016.

* cited by examiner

PHOTOACOUSTIC DETECTOR

RELATED APPLICATIONS

The present application is a national stage application under 35 U.S.C. § 371 of International Application No. PCT/CA2016/050511, filed 4 May 2016, which claims priority to U.S. Provisional Patent Application No. 62/179,502, filed 11 May 2015 and U.S. Provisional Patent Application No. 62/389,132 filed 18 Feb. 2016. The above-referenced applications are hereby incorporated by reference into the present application in their entirety.

TECHNICAL FIELD

The technical field generally relates to photoacoustic detectors, and more particularly, relates to photoacoustic detectors having a small internal volume and which are suitable to be used in gas chromatography applications and/or photoacoustic spectroscopy applications.

BACKGROUND

Photoacoustic detection of gases is primarily based on the analysis of the effects of absorbed electromagnetic energy on the gases. The measurement of these effects on the gases is carried out by means of acoustic detection. The electromagnetic energy involved in photoacoustic gas detection generally corresponds to optical radiation, which is known in the art to refer to electromagnetic radiation covering the wavelength range from 100 nm to 1 mm (see, e.g., standard DIN 5031).

There are gas detection applications where the size of the available gas sample to be measured is small and therefore the gas detector internal volume is limited. Moreover, there are applications where it is preferable to have a gas detector with an internal volume and a geometry which allows a gas sample to be flushed through the gas detector efficiently. In the latter case, the small internal volume should be of an elongated shape with the gas flowing from one end (inlet) towards the other end (outlet), resembling the gas flow inside a tube. The gas flow inside the detector is preferably smooth and uniform. The gas detector can, for example, be used for gas chromatography.

One design requirement for a photoacoustic detector is an acoustic resonance as a way to amplify a sound signal and therefore increase detector sensitivity. Resonant acoustic waves should be possible to produce and maintain within the detector internal volume. Typical design optimizations for improving gas detection sensitivity include larger microphones and diaphragms, dual or multiple microphones, resonant cavities with buffering volumes and larger cells and windows for maximizing radiation input.

However, these designs are not optimized for small internal volumes.

Therefore, there is a need for a photoacoustic detector design which has small internal volume and high sensitivity.

SUMMARY

One object of the present invention is to provide a solution to at least one of the above-mentioned prior art drawbacks.

According to the present invention, there is provided a photoacoustic detector for detecting a gas, comprising:

a body provided with an elongated channel having a section forming a resonant cavity, said resonant cavity having a given length and being provided with a section having an absorbing inner wall surface capable of absorbing electromagnetic radiation, the channel having a passageway for circulating the gas through the resonant cavity;

at least one electromagnetic source for generating an electromagnetic energy;

at least one optical window associated with said at least one electromagnetic source for introducing said electromagnetic energy into the resonant cavity towards the section having the absorbing inner wall surface, thereby preventing the electromagnetic energy from radiating throughout the whole length of the resonant cavity, said electromagnetic energy having wavelengths capable of being absorbed by the gas; and at least one pressure sensor having a sensing input for detecting a pressure signal in the resonant cavity, and an output for generating a signal indicative of the pressure signal which is representative of the gas being detected.

According to another aspect of the present invention, there is provided a method for detecting a gas, the method comprising the steps of:

a) providing a body provided with an elongated channel having a section forming a resonant cavity, said resonant cavity having a given length and being provided with a section having an absorbing inner wall surface capable of absorbing electromagnetic radiation, the channel having a passageway for circulating the gas through the resonant cavity;

b) generating an electromagnetic energy;

c) introducing the electromagnetic energy into the resonant cavity towards the section having the absorbing inner wall surface, thereby preventing the electromagnetic energy from radiating throughout the whole length of the resonant cavity, said electromagnetic energy having wavelengths capable of being absorbed by the gas; and d) detecting a pressure signal in the resonant cavity, and generating a signal indicative of the pressure signal which is representative of the gas being detected.

The components, advantages and other features of the photoacoustic detector implementations will become more apparent upon reading of the following non-restrictive description of some optional configurations, given for the purpose of exemplification only, with reference to the accompanying drawings.

DETAILED DESCRIPTION OF THE FIGURES

Figure 1:
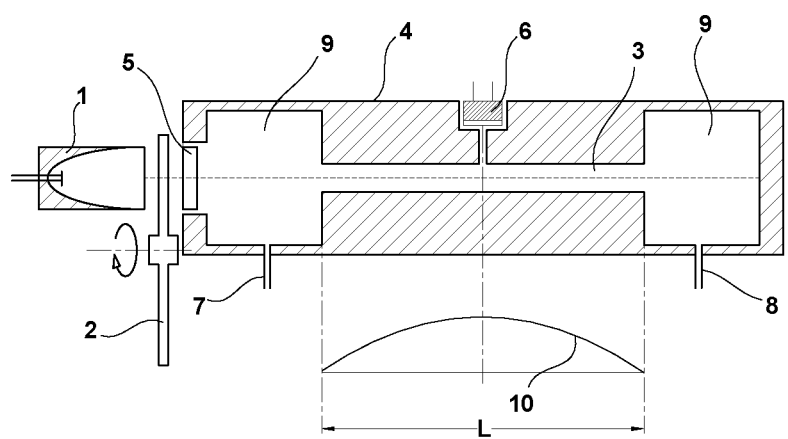
FIG. 1 is a schematic view of a resonant cell photoacoustic detector in accordance with the prior art.

The present invention generally relates to a photoacoustic detector, which can be used, among other applications, in gas chromatography and photoacoustic spectroscopy. Advantageously, the photoacoustic detector has a compact and efficient design. In some implementations, the photoacoustic detector includes a design to amplify a sound signal by resonance for increasing the sensitivity of the photoacoustic detector.

While embodiments of the photoacoustic detector can take many different forms, specific embodiments thereof are shown in the drawings and will be described herein in detail with the understanding that the present disclosure is to be considered as an exemplification of the present invention. No limitation to the specific embodiment illustrated is intended.

FIG. 1 illustrates a typical photoacoustic detector according to prior art. The photoacoustic detector cell 4 incorporates a radiation source 1, an optical chopper 2, a resonant cavity 3 and two buffer volumes 9. The radiation enters the detector cavity through an optical window 5. The optical window 5 is transmissive of a spectrum of electromagnetic energy which includes the wavelengths which are absorbed by the gas or gases of interest. The sound waves are measured in the center of the resonant cavity using a microphone 6.

The entire gas volume inside the resonant cavity 3 is excited by the radiation produced by the radiation source 1 heating up the gas inside the resonant cavity 3 and therefore creating a pressure wave with maximum amplitude in the center of the resonant cavity 3. The buffer volumes 9 provide fixed pressure points so the pressure inside the resonant cavity 3 will have a pressure profile 10 as shown in FIG. 1. The length L of the resonant cavity 3 should be substantially equal to the half the sound wavelength at optical chopper frequency.

The resonant cavity 3 in this case is a half-wave resonator with open ends. The pressure profile 10 of the fundamental standing wave for this type of resonant system has a maximum pressure point in the middle and two nodes at the ends.

One drawback of this prior art design is the presence of the buffer volumes 9 which are not compatible with gas chromatography applications as they are not easy to flush through. The design also incorporates an inlet port 7 and an outlet port 8 to allow gases of interest to be moved in and out of the detector cell 4.

Figure 2:
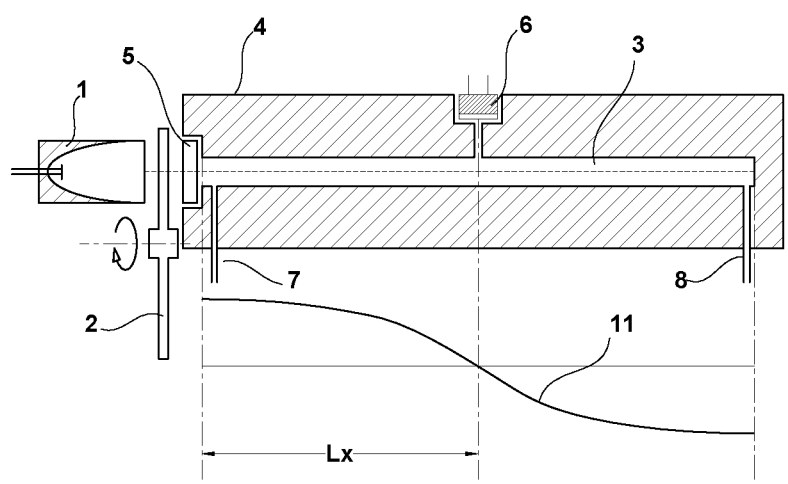
FIG. 2 is a schematic view of a non-resonant cell photoacoustic detector in accordance with the prior art.

FIG. 2 describes the functionality of another prior art photoacoustic detector design with the buffer volumes removed. The inlet port 7 and the outlet port 8 are connected directly to the internal cavity 3. The ports may have very small internal diameters by comparison with the diameter of the resonant cavity 3 in order to minimize wave dumping.

This prior art design provides the advantage of smooth and uniform internal flow but without the advantage of high sensitivity possible with a resonant cavity system.

The cavity 3 configuration could resonate as a half-wave resonator with closed ends. The pressure profile 11 of the fundamental standing wave for this type of resonant system has two maximum pressure points at the ends, and one node in the middle. The resulting pressure wave is positive on one half of the resonant cavity 3 and negative on the other half. In this configuration, the irradiative excitation will be in phase with half of the resonant cavity and in anti-phase with the other half. This will result in cancelling effects and therefore this configuration does not sustain resonance and therefore this is a non-resonant photoacoustic cell.

One solution for making this type of cell to resonate is by limiting the excitation zone to just a fraction of the resonant cavity 3 length, corresponding to a zone where the acoustic wave will be mostly in phase with the irradiative excitation. The excitation zone length Lx is preferably limited to the first half or less of the resonant cavity length, in front of the radiation source. This can be achieved, for example, by bending the resonant cavity path at a certain point along the length of the resonant cavity with the intent to obstruct the radiation propagation path or line-of-sight beyond that point.

Figure 3:
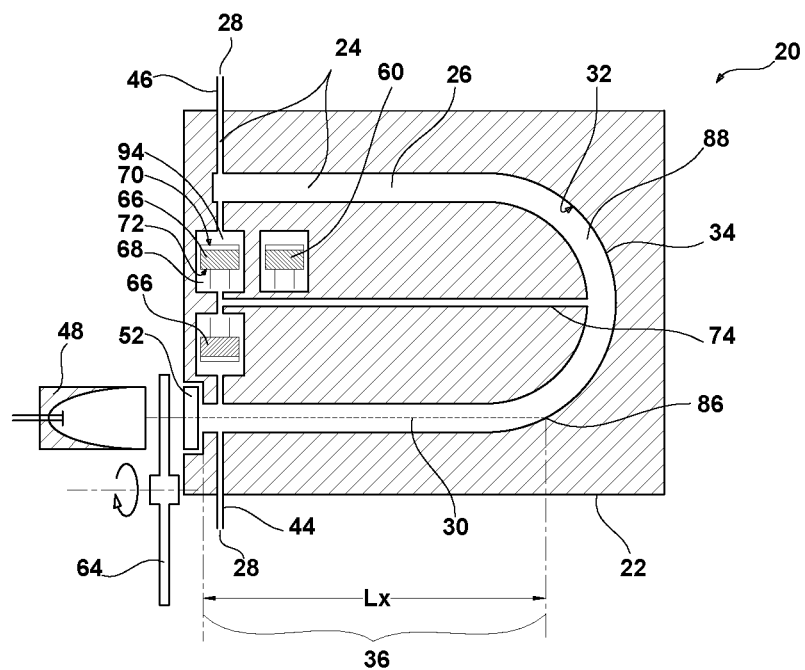
FIG. 3 is a schematic view of a resonant cell photoacoustic detector in accordance with an embodiment of the present invention.

Referring to FIG. 3, there is shown a photoacoustic detector 20 according to the present invention for detecting a gas. The gas in the present description can also refer to a plurality of gases. A particularity of the present invention is to provide a resonant photoacoustic detector 20 without buffer volumes.

The photoacoustic detector 20 includes a body 22 provided with an elongated channel 24. The body 22 can be any rigid enclosing structure for housing the channel 24 and any other additional components relative to the use of the photoacoustic detector 20.

The channel 24 defines an enclosed conduit that is capable of containing the gas. The channel 24 includes a section forming a resonant cavity 26 and a passageway 28 for circulating the gas through the resonant cavity 26.

The passageway 28 can be any gas conduit or through hole(s) to allow the gas to pass from one side to the other side of the passageway 28 for circulating the gas through the resonant cavity 26.

The resonant cavity 26 is the section of the channel 24 where standing pressure waves can be generated by heating the gas in the excitation volume 36 with pulsed electromagnetic radiation 30.

The excitation volume 36 is a section of the resonant cavity 26 where the electromagnetic radiation 30 can propagate. The excitation volume 36, having an excitation zone length Lx, is defined between the point where the electromagnetic radiation enters the resonant cavity 26 and a radiation obstruction point 86.

The radiation obstruction point 86 is a section of the resonant cavity 26 having an absorbing inner wall surface 32 capable of absorbing the electromagnetic radiation 30 with the intent to obstruct the radiation propagation into the passive volume 88. In the context of the present application, the radiation obstruction point 86 can be any zone or area capable of obstructing radiation propagation into the passive volume 88.

The passive volume 88 is a section of the resonant cavity 26 where most and preferably all of the electromagnetic radiation 30 will not propagate into and therefore the gases in this volume will not be significantly excited.

The resonant cavity 26 can include any shape and size of an acoustic oscillatory circuit having the form of a hollow-space resonator. The dimensions of the resonant cavity 26 are in relation preferably to the wavelength of the fundamental frequency of an acoustic standing wave, that is, the smallest natural frequency of the acoustic standing wave inside the resonant cavity 26.

In the illustrated embodiment of FIG. 3, the resonant cavity 26 is an elongated tube. The resonant cavity 26 includes at least one bend 34 along a lengthwise direction of the resonant cavity 26. The bend 34 can include any angle that can generate a partial or total obstruction to a path of the electromagnetic radiation 30. The bend 34 may have a 180 degrees angle, such as a "U" bend, for a more convenient and compact design. The radiation obstruction point 86 is located near the starting point of the bend 34 where most of the electromagnetic radiation 30 will be absorbed.

Figure 6:
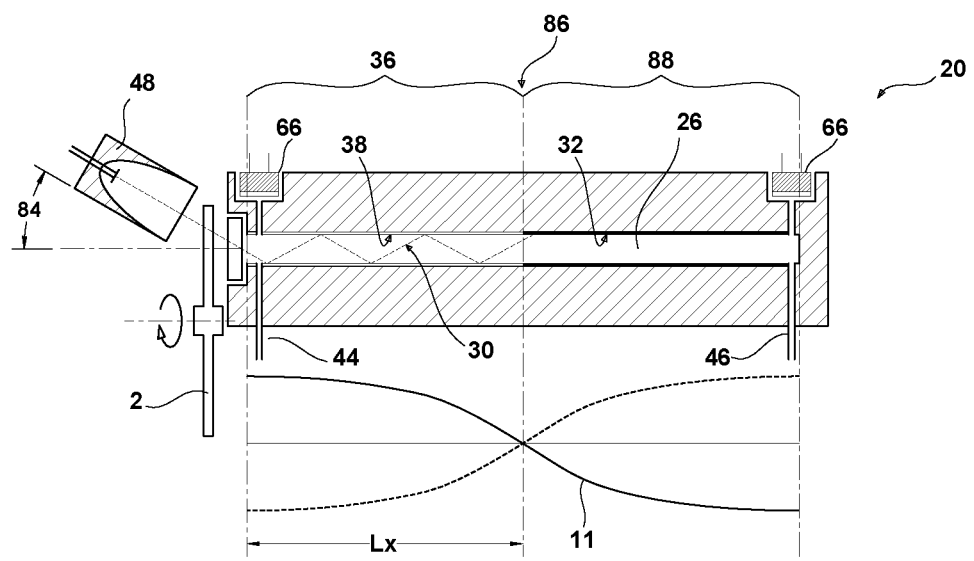
FIG. 6 is a schematic view of the photoacoustic detector in accordance with another embodiment of the present invention showing the standing wave pressure profile.

According to another embodiment, as shown in FIG. 6, the radiation obstruction point 86 is obtained by dividing the resonant cavity 26 into two sections: 1) a reflective section having a reflective inner wall 38, representing the excitation volume 36 and 2) an absorbent section having the absorbing inner wall surface 32, representing the passive volume 88. Electromagnetic energy is preferably reflected by the reflective inner wall 38 causing the gas within the reflective section to be excited. The absorbent inner wall surface 32, on the other hand, absorbs most of the electromagnetic energy, preferably substantially or all of the electromagnetic energy, and therefore substantially reducing the excitation of the gas in the absorbent section. The radiation obstruction point 86 is located near the limit between the reflective section and the absorbent section. In this configuration the electromagnetic energy is preferably introduced into the resonant cavity at an incident angle 84 in order to enable the electromagnetic radiation to reflect on the inner wall and therefore prevent parallel/direct propagation of the electromagnetic radiation beyond the radiation obstruction point 86 into the passive volume 88. The incident angle 84 should be greater than zero and smaller than 90 degrees and preferably between 5 and 30 degrees. In FIG. 6 the incident angle 84 can be achieved by tilting the electromagnetic source away from the resonant cavity 26 axes.

The location of the radiation obstruction point 86 along the length of the resonant cavity 26 can be optimized for increasing a signal gain or decreasing the excitation volume 36, depending on the use of the photoacoustic detector 20 for different applications. In case of a gas chromatography applications for example, the excitation volume 36 may be preferably smaller and therefore, the radiation obstruction point 86 will be placed closer to the beginning of the lengthwise path of the resonant cavity 26, thereby decreasing the length Lx of the excitation volume 36. However, reducing the excitation volume 36 may result in reduced signal and therefore reduced detection sensitivity.

Figure 7:
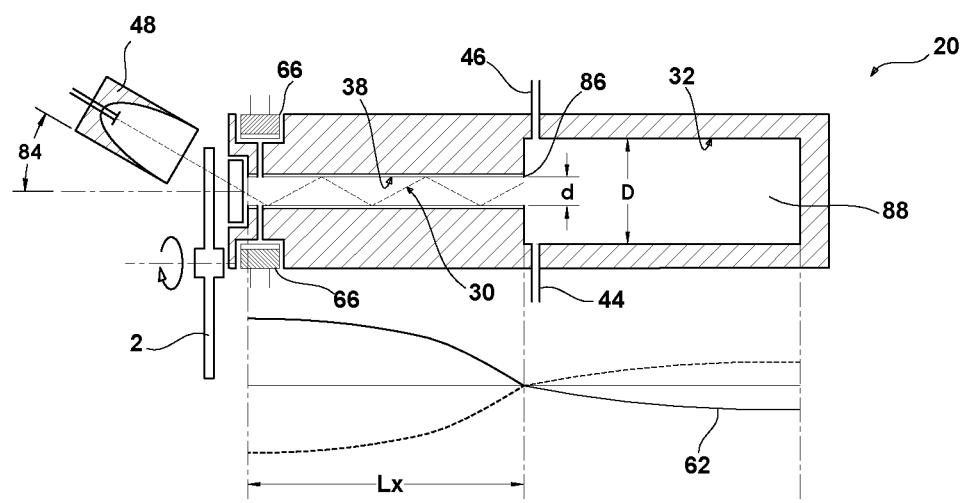
FIG. 7 is a schematic view of the photoacoustic detector in accordance with yet another embodiment of the present invention showing the standing wave pressure profile.

The diameter of the resonant cavity may have variations along its length and in some areas the diameter can be slightly or significantly bigger than in other areas. According to the embodiment shown in FIG. 7, the diameter of the passive volume 88 is bigger than the diameter of the excitation volume 36. Increasing the cross-sectional area of the passive volume 88 will result in lowering the acoustic impedance and therefore lowering the amplitude of the sound wave 62 inside the passive volume 88. This can help reduce the anti-phase excitation which may occur inside the passive volume 88 due to some electromagnetic radiation propagating beyond the obstruction point 86 into the passive volume 88.

Figure 5:
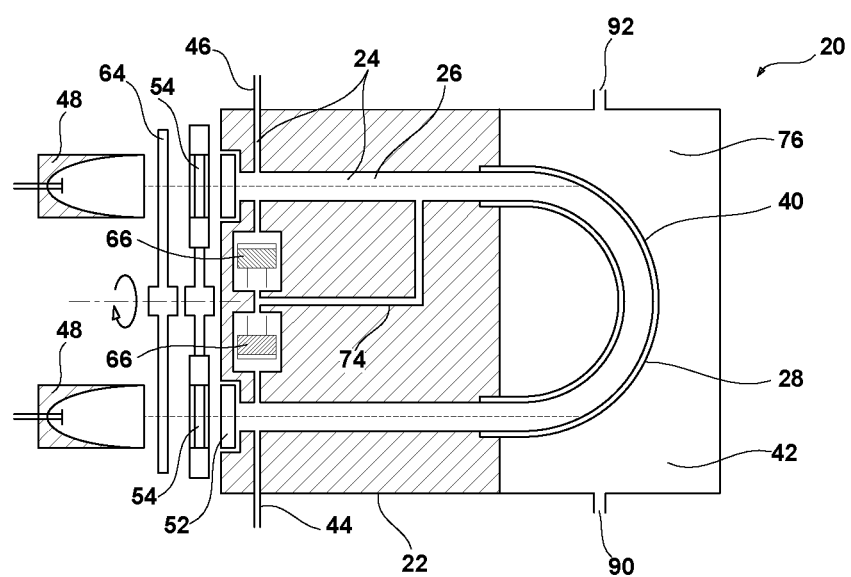
FIG. 5 is a schematic view of the photoacoustic detector in accordance with another embodiment of the present invention.

In the illustrated embodiment of FIG. 5, the passageway 28 is a portion of the channel 24 that is provided with a semipermeable wall 40 for circulating the gas through the resonant cavity 26. The semipermeable wall 40 has the ability to preferentially permeate one or more components, such as gas particles, of a fluid mixture 42 while simultaneously restraining permeation of one or more other components, such as liquid particles. This embodiment is preferred for applications other than gas chromatography. The use of the semipermeable wall 40 is useful when detection of gas in the fluid mixture 42 is required. The body 22 can include a gas extraction cell 76 containing the fluid mixture 42. The gas extraction cell 76 can be a section of the body 22 enclosing the passageway 28 and allowing the gas of interest to pass from the gas extraction cell 76 into the resonant cavity 26 by diffusion through the semipermeable wall 40. The gas extraction cell 76 can be filled with any fluid containing the gas of interest. A fluid inlet port 90 and a fluid outlet port 92 are mounted on the gas extraction cell 76 allowing the fluid to be transferred in and out of the gas extraction cell 76.

Referring again to FIG. 3, the passageway 28 includes inlet 44 and outlet 46 for circulating the gas through the resonant cavity 26. The photoacoustic detector 20 also includes at least one electromagnetic source 48 for generating an electromagnetic energy, whereby the electromagnetic energy has wavelengths capable of being absorbed by the gas to be detected. The electromagnetic energy refers to the electromagnetic radiation 30 which can be absorbed by the gas inside the resonant cavity 26. The absorption primarily depends on the electronic and molecular structure of the gas. The electromagnetic radiation 30 is classified according to the frequency of its waves.

The electromagnetic source 48 may comprise a laser radiation source, an LED source, an incandescent lamp assembly or the like. Preferably, the electromagnetic source 48 generates electromagnetic radiation 30 with a wavelength ranging from 3000 to 5000 nanometer (nm). The selection of the electromagnetic radiation 30 depends on the gas being detected. A gas will have maximum absorbance of the electromagnetic radiation 30 at specific wavelengths. For example, with reference to FIG. 8, methane gas 50 has the largest absorbance at wavelengths in the range of 3250 nm.

Figure 8:
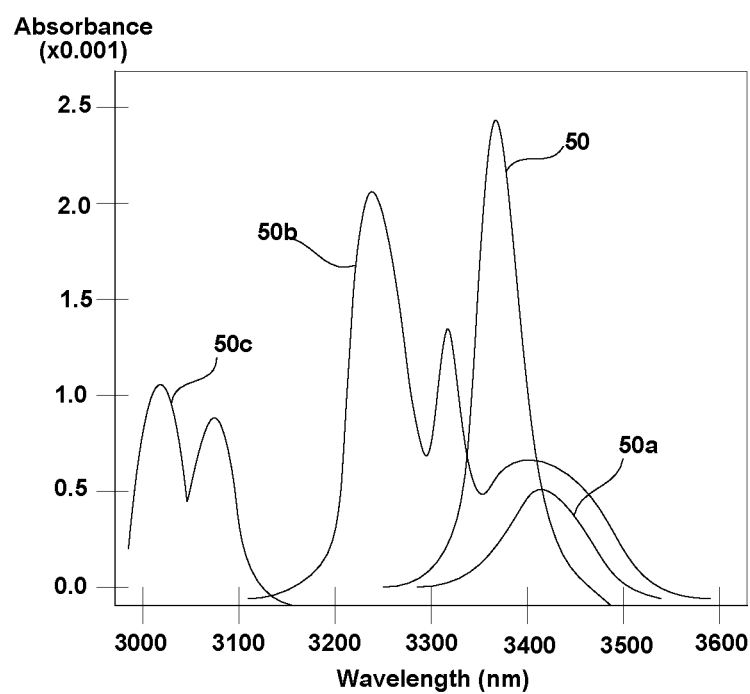
FIG. 8 is a graphical view of absorbance spectra showing absorbance versus wavelength of selected gases.

Referring now to FIG. 8, intensity of absorption of radiation varies as a function of wavelength, or frequency. For example, the absorbance of ethane gas 50 of electromagnetic radiation 30 having a wavelength in the range of 3380 nm is in the order of $2.5 \times 10^{-3}$. However, the absorbance of ethane gas 50 of electromagnetic radiation 30, having a wavelength below 3300 nm or above 3420 nm, is mostly below $0.5 \times 10^{-3}$ and approaches zero as the wavelength is moved away from the range of 3380 nm. Other gases are also shown in FIG. 8, such as propane 50$a$, methane 50$b$ and acetylene 50$c$.

Figure 4:
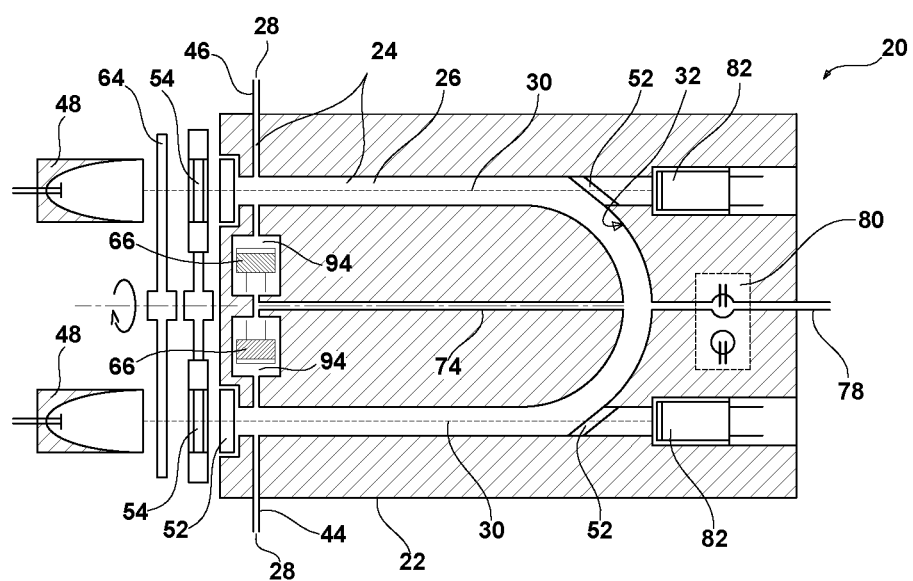
FIG. 4 is a schematic view of the photoacoustic detector in accordance with another embodiment of the present invention.

Referring now to FIGS. 3, 4 and 5, there is shown at least one optical window 52 associated with the at least one electromagnetic source 48 for introducing the electromagnetic energy into the resonant cavity 26 towards the section having the absorbing inner wall surface 32 thereby preventing the electromagnetic energy to radiate throughout the whole length of the resonant cavity 26. The optical window 52 refers to one or more apertures, openings, transparent or translucent portions of the body 22 allowing transmission of the electromagnetic energy into the resonant cavity 26.

In some embodiments, the photoacoustic detector 20 also includes at least one optical lens (not shown) mounted between the at least one electromagnetic source 48 and the at least one optical window 52 for focusing the electromagnetic energy into the resonant cavity 26. The lens can also direct the electromagnetic energy inside the resonant cavity 26.

Referring still to FIG. 3, there is shown an optical chopper 64 mounted between the at least one electromagnetic source 48 and the at least one optical window 52. The chopper 64 is preferably operated at a frequency selected in relation to the length of the resonant cavity 26. The optical chopper 64 can be any device capable of periodically interrupting the electromagnetic energy for providing pulsed electromagnetic radiation 30 into the resonant cavity 26. The pulsed electromagnetic radiation 30 can excite the gas inside the resonant cavity 26 generating a resonant standing sound wave which can be used to amplify the sound signal for increasing the sensitivity of the photoacoustic detector 20.

Alternatively, the electromagnetic source 48 can be of a pulsable radiation source for providing pulsed electromagnetic radiation 30 into the resonant cavity 26. According to an embodiment comprising the pulsable radiation source, the optical chopper 64 may be omitted.

Referring to FIGS. 4 and 5, the photoacoustic detector 20 can also include at least one optical filter 54 mounted between the at least one electromagnetic source 48 and the at least one optical window 52 for filtering the electromagnetic energy according to a range of wavelengths selected in relation to the gas being detected. The optical filter 54 can be a radiation band pass filter to narrow a range of radiation wavelengths entering the resonant cavity 26. The optical filter 54 is advantageously used to selectively excite components of the gas being detected.

Alternatively, the at least one optical window 52 incorporates an optical filter for filtering the electromagnetic energy according to a range of wavelengths selected in relation to the gas being detected.

Referring now specifically to FIG. 4, this embodiment has at least one additional gas connection port 78. It should be noted that the suggested locations of the inlet 44 and the outlet 46 are just exemplifications and therefore other gas connectivity ports and other port locations connected to the resonant cavity 26 can be considered. One example is the illustrated gas connection port 78.

Another feature of this embodiment is a Thermal Conductivity Detector (TCD) 80 connected along one of the gas connection ports. The TCD 80 can provide an additional detection signal for gas components with a low photoacoustic response but high TCD response, an example is hydrogen.

Another optional feature of this embodiment is the presence of one or more radiation detectors 82 optically connected to the resonant cavity 26 via optical windows 52. This arrangement can provide additional measurement information regarding the amount of total radiation and/or the amount of radiation absorbed by the gas inside the resonant cavity 26. The additional measurement information can be used to further improve the overall sensitivity of the photoacoustic detector and/or expand detector dynamic range.

Another optional feature of this embodiment is the presence of radiation band pass filters or optical filters 54 placed between the electromagnetic sources 48 and the resonant cavity 26 in order to narrow the range of radiation wavelengths entering the resonant cavity 26. The purpose of the optical filters could be selective excitation of gas components of interest.

Referring now to FIGS. 4 and 5, the at least one electromagnetic source 48 includes first and second electromagnetic sources, and the at least one optical window 52 includes first and second optical windows associated respectively with the first and second electromagnetic sources 48. The first and second electromagnetic sources 48 can be located respectively at both ends of the channel 24.

In certain embodiments, as shown in FIGS. 4 and 5, a single optical chopper 64 can be used to provide pulsed electromagnetic radiation 30 from the first electromagnetic and second electromagnetic sources 48. In other embodiments, each electromagnetic source 48 can be used with a corresponding optical chopper. In yet other embodiments, one single electromagnetic source 48 can be used for radiating towards both ends of the channel 24.

Referring still to FIGS. 4 and 5, electromagnetic radiation 30 from the first and second electromagnetic sources 48 can be emitted in antiphase with respect to each other and in-phase with respect to the resonant sound wave inside the resonant cavity 26. This embodiment can increase excitation of the resonant sound wave in order to increase the amplitude of the resonant sound wave and therefore increase the photoacoustic detector sensitivity.

In certain applications, it may be preferable to use first electromagnetic source 48 for detecting a first gas, and to use the second electromagnetic source 48 for detecting a second gas.

Referring back to FIG. 3, the photoacoustic detector 20 also includes at least one pressure sensor 66 having a sensing input for detecting a pressure signal inside the resonant cavity 26, and an output for generating a signal indicative of the pressure signal which is representative of the gas being detected. The pressure sensor 66 has first 70 and second 72 opposite surfaces. The first surface 70 is a sensing surface facing the sensing chamber 94 which is connected to the resonant cavity 26.

In operation, the absorption of the electromagnetic radiation 30 by the gas, heats up the gas inside the excitation volume 36 and therefore generates a pressure wave inside the resonant cavity 26. The pressure wave is the pressure signal that is picked up by the sensing input of the pressure sensor 66. A monitor (not shown) can display the pressure signal for gas detection.

Some pressure sensors require an average pressure around the first surface 70 of the pressure sensor 66 to be substantially equal with an average pressure around the second surface 72 of the pressure sensor 66. In this case, the body 22 can include at least one pressure chamber 68 for housing the at least one pressure sensor 66 and a pressure equalisation duct 74 fluidly connecting the resonant cavity 26 and the at least one pressure chamber 68, nearby the second surface 72 of the at least one pressure sensor 66. The pressure equalisation duct 74 regulates the average pressure inside the pressure chamber 68.

The photoacoustic detector 20 can also include an auxiliary pressure sensor 60 mounted inside the body 22 and proximate to the at least one pressure sensor 66 for detecting background noise and generating a signal indicative of the background noise. For background noise cancelation, the signal indicative of the background noise can be subtracted from the signal indicative of the pressure signal. Advantageously, the background noise cancelation improves the detection sensitivity of the photoacoustic detector 20.

In yet another embodiment, the acoustic coupling between the resonant cavity 26 and the pressure sensor 66 can be improved by making the sensing chamber 94, a resonant cavity, resonating at similar frequencies as the resonant cavity 26. For example, the sensing chamber 94 may resemble a Helmholtz resonator having the "nipple" connected to the resonant cavity 26.

Referring now to FIG. 3, the present invention also provides a method for detecting a gas using the photoacoustic detector 20. The method includes the step of providing a body 22 provided with an elongated channel 24 having a section forming a resonant cavity 26. The resonant cavity 26 has a given length and is provided with a section having an absorbing inner wall surface 32 capable of absorbing electromagnetic radiation 30. The channel 24 has a passageway 28 for circulating the gas through the resonant cavity 26. The second step includes generating the electromagnetic energy.

The following step includes introducing the electromagnetic energy into the resonant cavity 26 towards the section having the absorbing inner wall surface 32, thereby preventing the electromagnetic energy to radiate throughout the whole length of the resonant cavity 26. The electromagnetic energy has wavelengths capable of being absorbed by the gas. In some embodiments, it is preferred to include a step of focusing the electromagnetic energy into the resonant cavity 26 and a step of filtering the electromagnetic energy according to a range of wavelengths selected in relation to the gas being detected.

The next step includes detecting a pressure signal inside the resonant cavity 26 and generating a signal indicative of the pressure signal which is representative of the gas being detected. It is preferred to include a step of detecting background noise and generating a signal indicative of said background noise for subtracting the signal indicative of the background noise from the signal indicative of the pressure signal.

In the above description, the same numerical references refer to similar elements. Furthermore, for the sake of simplicity and clarity, namely so as to not unduly burden the figures with several reference numbers, not all figures contain references to all the components and features, and references to some components and features may be found in only one figure, and components and features of the present invention illustrated in other figures can be easily inferred therefrom. The embodiments, geometrical configurations, materials mentioned and/or dimensions shown in the figures are optional, and are given for exemplification purposes only.

Furthermore, although the present invention may be used with various objects, such as photoacoustic gas detectors, for example, it is understood that it may be used with other chromatography or spectroscopy applications. For this reason, expressions such as "electromagnetic energy", "electromagnetic radiation", etc. as used herein should not be taken as to limit the scope of the present invention to these devices in particular. These expressions encompass all other kinds of materials, objects and/or purposes with which the present invention could be used and may be useful, as can be easily understood.

The invention claimed is:

1. A photoacoustic detector for detecting a gas, comprising:
    a body provided with an elongated channel having a section forming a resonant cavity, said resonant cavity having a given length and being provided with a section having an absorbing inner wall surface capable of absorbing electromagnetic radiation, the channel having a passageway for circulating the gas through the resonant cavity;
    at least one optical electromagnetic source for generating an electromagnetic energy;
    at least one optical window associated with said at least one optical electromagnetic source for introducing said electromagnetic energy into the resonant cavity towards the section having the absorbing inner wall surface, thereby preventing the electromagnetic energy from radiating throughout the whole length of the resonant cavity, said electromagnetic energy having wavelengths capable of being absorbed by the gas; and
    at least one pressure sensor having a sensing input for detecting a pressure signal in the resonant cavity, and an output for generating a signal indicative of the pressure signal which is representative of the gas being detected.

2. The photoacoustic detector according to claim 1, wherein the passageway comprises a portion of the channel that is provided with a semipermeable wall for circulating the gas through the resonant cavity.

3. The photoacoustic detector according to claim 1, wherein the passageway comprises an inlet and an outlet for circulating the gas through the resonant cavity.

4. The photoacoustic detector according to claim 1, wherein the resonant cavity includes at least one bend along a lengthwise direction of said resonant cavity.

5. The photoacoustic detector according to claim 1, further comprising at least one optical lens mounted between the at least one optical electromagnetic source and the at least one optical window for focusing the electromagnetic energy into the resonant cavity.

6. The photoacoustic detector according to claim 1, further comprising an optical filter mounted between the at least one optical electromagnetic source and the at least one optical window for filtering the electromagnetic energy according to a range of wavelengths selected in relation to the gas being detected.

7. The photoacoustic detector according to claim 1, wherein the at least one optical window incorporates an optical filter for filtering the electromagnetic energy according to a range of wavelengths selected in relation to the gas being detected.

8. The photoacoustic detector according to claim 1, further comprising an optical chopper mounted between the at least one optical electromagnetic source and the at least one optical window, said optical chopper being operated at a frequency selected in relation to the length of the resonant cavity.

9. The photoacoustic detector according to claim 1, wherein the at least one optical electromagnetic source comprises first and second optical electromagnetic sources, and the at least one optical window comprises first and second optical windows associated respectively with the first and second optical electromagnetic sources, said first and second optical electromagnetic sources being located respectively at both ends of the channel.

10. The photoacoustic detector according to claim 1, wherein the body further comprises:
    at least one pressure chamber for housing the at least one pressure sensor, the at least one pressure sensor having first and second opposite surfaces, the first surface being a sensing surface facing the resonant cavity; and
    a pressure equalisation duct fluidly connecting the resonant cavity and the at least one pressure chamber, nearby the second surface of the at least one pressure sensor.

11. The photoacoustic detector according to claim 1, further comprising an auxiliary pressure sensor mounted inside the body and proximate to the at least one pressure sensor for detecting background noise and generating a signal indicative of said background noise for subtracting the signal indicative of the background noise from the signal indicative of the pressure signal.

12. A method for detecting a gas, the method comprising the steps of:
    a) providing a body provided with an elongated channel having a section forming a resonant cavity, said resonant cavity having a given length and being provided with a section having an absorbing inner wall surface capable of absorbing electromagnetic radiation, the channel having a passageway for circulating the gas through the resonant cavity;

b) generating an electromagnetic energy with an optical electromagnetic source;
c) introducing the electromagnetic energy into the resonant cavity towards the section having the absorbing inner wall surface, thereby preventing the electromagnetic energy from radiating throughout the whole length of the resonant cavity, said electromagnetic energy having wavelengths capable of being absorbed by the gas; and
d) detecting a pressure signal in the resonant cavity, and generating a signal indicative of the pressure signal which is representative of the gas being detected.

13. The method for detecting a gas according to claim 12, further comprising a step of focusing the electromagnetic energy into the resonant cavity.

14. The method for detecting a gas according to claim 12, further comprising a step of filtering the electromagnetic energy according to a range of wavelengths selected in relation to the gas being detected.

15. The method for detecting a gas according to claim 12, further comprising a step of detecting background noise and generating a signal indicative of said background noise for subtracting the signal indicative of the background noise from the signal indicative of the pressure signal.

16. An apparatus for performing gas analysis comprising a photoacoustic spectroscopy measurement system for deriving information conveying a concentration of a specific target gas in a gas sample, said photoacoustic spectroscopy measurement system having an elongated channel including a resonant cavity and an optical electromagnetic energy source, wherein the resonant cavity includes a first portion and a second portion configured for containing at least part of the gas sample, wherein said first portion of the resonant cavity defines an optical pathway configured for propagation of electromagnetic energy from the optical electromagnetic energy source, and wherein the resonant cavity includes an element configured for obstructing the propagation of the electromagnetic energy from the optical electromagnetic energy source through to the second portion of the resonant cavity, the photoacoustic spectroscopy measurement system being configured to excite a portion of the gas sample contained in the optical pathway defined by the first portion of the resonant cavity to produce a photoacoustic signal conveying information associated with the specific target gas.

17. The apparatus according to claim 16, wherein the element of the resonant cavity configured for obstructing the propagation of the electromagnetic energy includes an absorbing inner wall surface in a portion of the resonant cavity, said absorbing inner wall being configured for absorbing electromagnetic radiation.

18. The apparatus according to claim 17, wherein the element of the resonant cavity configured for obstructing the propagation of the electromagnetic energy includes a bend in the resonant cavity.

19. The apparatus according to claim 18, wherein the bend has a curvature configured for obstructing the propagation of the electromagnetic energy propagating through the resonant cavity.

20. The apparatus according to claim 19, wherein the resonant cavity is a U-shaped cavity.

21. The apparatus according to claim 16, wherein the resonant cavity includes a U-shaped cavity including two elongated portions and a curved portion linking the two elongated portions, wherein the first portion of the resonant cavity defining the optical pathway is one of the two elongated portions.

22. The apparatus according to claim 16, wherein the first portion of the resonant cavity has a reflective inner wall configured for reflecting electromagnetic energy propagating through the first portion of the resonant cavity.

23. The apparatus according to claim 16, wherein the resonant cavity has a substantially elongated tubular form.

24. The apparatus according to claim 23, wherein the resonant cavity has an internal diameter size substantially of constant size along its length.

25. The apparatus according to claim 23, wherein an internal diameter size of the second portion of the resonant cavity is no greater than an internal diameter size of the first portion of the resonant cavity defining the optical pathway.

26. The apparatus according to claim 16, wherein the optical electromagnetic energy source is a first optical electromagnetic energy source, said photoacoustic spectroscopy measurement system further comprising a second optical electromagnetic energy source, and wherein said first and second optical electromagnetic energy sources are located at respective ends of the elongated channel.

27. The apparatus according to claim 16, wherein the optical electromagnetic energy source is configured for producing a periodically pulsed beam of electromagnetic radiation to excite the gas sample contained in the optical pathway defined by the first portion of the resonant cavity.

28. The apparatus according to claim 16, said photoacoustic spectroscopy measurement system further comprising an optical chopper mounted in relation to the optical electromagnetic energy source for producing a periodically pulsed beam of electromagnetic radiation to excite the gas sample contained in the optical pathway defined by the first portion of the resonant cavity.

29. The apparatus according to claim 16, said photoacoustic spectroscopy measurement system comprising a plurality of optical filters associated with respective frequency bands for selectively exciting corresponding specific target gases in the gas sample contained in the optical pathway defined by the first portion of the resonant cavity.

30. An apparatus for performing gas analysis on a gas sample to determine a concentration of a specific target gas in the gas sample, the apparatus comprising a photoacoustic spectroscopy measurement system comprising:
an elongated channel including a resonant cavity for containing at least part of the gas sample,
said resonant cavity having a first portion defining an excitation volume, a second portion defining a passive volume, and an electromagnetic energy obstruction element disposed between the first portion and the second portion; and
an optical electromagnetic energy source,
wherein said first portion of the resonant cavity defines an optical pathway configured for propagation of electromagnetic energy from the optical electromagnetic energy source,
wherein upon propagation of the electromagnetic energy from the optical electromagnetic energy source through the optical pathway, the photoacoustic spectroscopy measurement system is configured to excite a portion of the gas sample contained in the excitation volume of the first portion of the resonant cavity to produce a photoacoustic signal conveying information associated with the specific target gas,
wherein upon propagation of the electromagnetic energy from the optical electromagnetic energy source through the resonant cavity, the electromagnetic energy obstruction element is configured to prevent propagation of the electromagnetic energy beyond the electromagnetic energy obstruction element and to the second portion of the resonant cavity so as to limit excitation of the gas sample in the passive volume of the second portion of the resonant cavity.

31. The apparatus according to claim 16, wherein the optical electromagnetic energy source is configured to emit the electromagnetic energy in a wavelength range of 3,000 nm to 5,000 nm.

* * * * *